(12) United States Patent
Yamaguchi et al.

(10) Patent No.: US 11,905,600 B2
(45) Date of Patent: Feb. 20, 2024

(54) AL-PLATED HOT STAMPED STEEL MATERIAL

(71) Applicant: NIPPON STEEL CORPORATION, Tokyo (JP)

(72) Inventors: Shinichi Yamaguchi, Tokyo (JP); Soshi Fujita, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 17/910,289

(22) PCT Filed: Mar. 24, 2021

(86) PCT No.: PCT/JP2021/012395
§ 371 (c)(1),
(2) Date: Sep. 8, 2022

(87) PCT Pub. No.: WO2021/235083
PCT Pub. Date: Nov. 25, 2021

(65) Prior Publication Data
US 2023/0138051 A1  May 4, 2023

(30) Foreign Application Priority Data
May 18, 2020  (JP) .................. 2020-086561

(51) Int. Cl.
*B32B 15/01* (2006.01)
*C23C 22/12* (2006.01)
(Continued)

(52) U.S. Cl.
CPC ............ *C23C 22/12* (2013.01); *B32B 15/012* (2013.01); *C23C 2/12* (2013.01); *C23C 22/78* (2013.01);
(Continued)

(58) Field of Classification Search
None
See application file for complete search history.

(56) References Cited

U.S. PATENT DOCUMENTS

| | | | | |
|---|---|---|---|---|
| 6,090,224 A | * | 7/2000 | Wichelhaus | C23C 22/83 106/14.12 |
| 2011/0305840 A1 | * | 12/2011 | Ishii | C23C 22/78 106/286.6 |

(Continued)

FOREIGN PATENT DOCUMENTS

| JP | 11-502569 A | 3/1999 |
|---|---|---|
| JP | 2010-106334 A | 5/2010 |

(Continued)

OTHER PUBLICATIONS

Girčienė et al., "Active corrosion protection capacity of phosphate-permanganate conversion coatings doped with cerium", Chemija, 2016, vol. 27, No. 1, pp. 1-10.

*Primary Examiner* — Daniel J. Schleis
(74) *Attorney, Agent, or Firm* — Birch, Stewart, Kolasch & Birch, LLP (57) ABSTRACT

Provided is an Al-plated hot stamped steel material comprising a steel base material, an Al-plating layer formed on at least one surface of the steel base material, and a chemical conversion coating formed on the Al-plating layer and containing zinc phosphate-based crystals and Ce-based compounds deposited on the surfaces of the zinc phosphate-based crystals, wherein an amount of deposition of the zinc phosphate-based crystals in the chemical conversion coating is, converted to metal Zn, 0.3 to 4.0 g/m$^2$ and an area ratio of the Ce-based compounds in the chemical conversion coating is 0.5 to 25%.

16 Claims, 2 Drawing Sheets

(51) Int. Cl.
  *C23C 2/12*    (2006.01)
  *C23C 22/78*   (2006.01)
  *C23C 28/00*   (2006.01)
  *C22C 38/00*       (2006.01)
  *C22C 38/02*       (2006.01)
  *C22C 38/04*       (2006.01)
  *C22C 38/06*       (2006.01)
  *C22C 38/14*       (2006.01)

(52) U.S. Cl.
  CPC ............ *C23C 28/321* (2013.01); *C23C 28/34* (2013.01); *C22C 38/001* (2013.01); *C22C 38/002* (2013.01); *C22C 38/02* (2013.01); *C22C 38/04* (2013.01); *C22C 38/06* (2013.01); *C22C 38/14* (2013.01)

(56) References Cited

U.S. PATENT DOCUMENTS

| | | |
|---|---|---|
| 2015/0020562 A1 | 1/2015 | Yamanaka et al. |
| 2018/0079174 A1 | 3/2018 | Kawamura et al. |
| 2018/0171164 A1 | 6/2018 | Fujita et al. |

FOREIGN PATENT DOCUMENTS

| | | |
|---|---|---|
| WO | WO 2013/122004 A1 | 8/2013 |
| WO | WO 2016/159307 A1 | 10/2016 |
| WO | WO 2016/195101 A1 | 12/2016 |

\* cited by examiner

AL-PLATED HOT STAMPED STEEL MATERIAL

FIELD

The present invention relates to an Al-plated hot stamped steel material, more particularly relates to an Al-plated hot stamped steel material which is chemically converted.

BACKGROUND

As the technique for press-forming a material which is hard to shape such as high strength steel sheet, hot stamping (hot pressing) is known. Hot stamping is a technique for hot shaping which shapes a material supplied for shaping after heating it. In this technique, the material is shaped after being heated, therefore at the time of shaping, the steel material is soft and has excellent shapeability. Therefore, even a high strength steel material can be formed into a complicated shape with a good precision. Further, it is known that the shaped steel material has sufficient strength since it is hardened at the same time as being shaped by the press die.

In the past, to improve the chemical convertability, coating film adhesion, slidability, etc., of a plated steel sheet for hot stamping, for example, it is known to provide the plated steel sheet with a surface treated layer containing zinc oxide (ZnO) or other specific compound.

PTL 1 describes a hot dip zinc-based coated steel sheet provided with a surface treated layer containing one or more oxides having particle sizes of 5 nm or more and 500 nm or less selected from zirconia, lanthanum oxide, cerium oxide, and neodymium oxide in a range per side of 0.2 g/m$^2$ or more and 2 g/m$^2$ or less and, furthermore, containing magnesium oxide, calcium oxide, or zinc oxide in a range per side of 0.2 g/m$^2$ or more and 5.0 g/m$^2$ or less. Further, PTL 1 teaches that the phosphate treatability is improved by the presence of magnesium oxide, calcium oxide, or zinc oxide at the surface layer of the surface treated layer after hot pressing.

PTL 2 describes a surface treatment solution for a plated steel sheet for hot pressing containing a ZnO aqueous dispersion (A) and an aqueous dispersible organic resin (B) wherein the ZnO aqueous dispersion (A) contains water and ZnO particles with an average particle size of 10 to 300 nm, the aqueous dispersible organic resin (B) has an emulsion average particle size of 5 to 300 nm, and a mass ratio ($W_A/W_B$) of a mass ($W_A$) of ZnO particles in the ZnO aqueous dispersion and a mass ($W_B$) of solid content of the aqueous dispersible organic resin is 30/70 to 95/5. Further, PTL 2 describes that by using the above surface treatment solution to form a surface treated coating containing ZnO particles and an aqueous dispersible organic resin in a specific mass ratio on the surface of a plated steel sheet, it is possible to secure water-proofness of the film, solvent resistance, and adhesion with the plated steel sheet and obtain a plated steel sheet stably excellent in hot lubrication ability, chemical conversion ability after hot pressing, corrosion resistance after coating, and spot weldability. In addition, PTL 2 describes that by including in the above surface treatment solution at least one additive (C) selected from compounds containing elements selected from the group consisting of B, Mg, Si, Ca, Ti, V, Zr, W, and Ce, it is possible to further improve the corrosion resistance after coating.

CITATION LIST

Patent Literature

[PTL 1] WO 2016/159307
[PTL 2] WO 2016/195101

SUMMARY

Technical Problem

For example, in an Al-based plated steel sheet for hot stamping, a plating layer containing an alloy layer containing Al and Fe and in some cases further Si is formed on the steel base material by Fe diffusing from the steel base material (base iron) due to the hot stamping, then in general chemical conversion is applied to form a phosphate film or other chemical conversion coating and furthermore coating is performed by electrodeposition coating, etc. Here, it is known that at the time of hot stamping, the above alloy layer formed on the steel base material is relatively hard, therefore the Al-plated hot stamped steel material provided with the plating layer containing the alloy layer and furthermore treated by chemical conversion is resistant to defects reaching the steel base material and in general is excellent in corrosion resistance after coating. However, even in such an Al-plated hot stamped steel material, once a defect reaching down to the steel base material is formed, the steel base material will become increasingly corroded and the corrosion resistance after coating is liable to fall. For this reason, there is a need for Al-plated hot stamped steel material exhibiting a high corrosion resistance after coating even under more severe conditions.

The invention described in PTL 1 relates to hot dip zinc-based coated steel sheet. For this reason, PTL 1 does not describe or suggest in any way an Al-plated hot stamped steel material and improvement of its corrosion resistance after coating.

Further, PTL 2, as described above, describes that by forming a surface treated coating containing ZnO particles and an aqueous dispersible organic resin in a specific mass ratio on the surface of a plated steel sheet, it is possible to obtain a plated steel sheet excellent in corrosion resistance after coating, etc. However, the organic resin contained in the surface treated coating is liable to have part of the carbon forming it burned up under the high temperature at the time of hot stamping and furthermore rob oxygen from part of the adjoining ZnO particles when burning in this way. In such a case, there is a possibility that the form and/or function of the surface treated coating initially intended will no longer be able to be completely maintained, therefore in the surface treatment solution described in PTL 2, there was still room for improvement when considering hot stamping under a high temperature.

The present invention was made in consideration of the above and has as its object to provide improved corrosion resistance after coating in an Al-plated hot stamped steel material treated for chemical conversion after hot stamping.

Solution to Problem

The present invention to achieve the above object is as follows:

(1) An Al-plated hot stamped steel material comprising a steel base material,
an Al-plating layer formed on at least one surface of the steel base material, and a chemical conversion coating formed on the Al-plating layer and containing zinc phosphate-based crystals and Ce-based compounds deposited on surfaces of the zinc phosphate-based crystals, wherein an amount of deposition of the zinc phosphate-based crystals in the chemical conversion coating is, converted to metal Zn, 0.3 to 4.0 g/m² and an area ratio of the Ce-based compounds in the chemical conversion coating is 0.5 to 25%.

(2) The Al-plated hot stamped steel material according to the above (1), wherein the zinc phosphate-based crystals contain at least one compound of hopeite and phosphophyllite.

(3) The Al-plated hot stamped steel material according to the above (1) or (2), wherein the amount of deposition of the Ce-based compounds in the chemical conversion coating is, converted to metal Ce, 1.0 to 280 mg/m².

(4) The Al-plated hot stamped steel material according to any one of the above (1) to (3), wherein the Ce-based compounds include at least one compound selected from the group consisting of $CeO_2$, $Ce(OH)_3$, and $Ce(OH)_4$.

(5) The Al-plated hot stamped steel material according to any one of the above (1) to (4), wherein the Al-plating layer includes an Al—Fe—Si alloy layer.

Advantageous Effects of Invention

According to the present invention, by forming a chemical conversion coating containing zinc phosphate-based crystals and Ce-based compounds deposited on the surfaces of the zinc phosphate-based crystals and, furthermore, by suitable controlling the amounts of deposition of these, etc., even if a defect reaching the steel base material is formed in the Al-plated hot stamped steel material, at the defect part, Ce can be eluted from the above Ce-based compounds and form a protective film at the cathodic reaction region of the exposed part of the steel base material, therefore it becomes possible to suppress progression of the cathodic reaction at the exposed part of the steel base material. As a result, according to the present invention, it is possible to obtain an Al-plated hot stamped steel material in which occurrence of coating film blisters, etc., is remarkably inhibited and in which corrosion resistance after coating, in particular long term corrosion resistance after coating, is excellent.

BRIEF DESCRIPTION OF DRAWINGS

FIGS. 2A and 2B show images of a chemical conversion coating observed by a scan electron microscope (SEM), wherein

DESCRIPTION OF EMBODIMENTS

<Al-Plated Hot Stamped Steel Material>

The Al-plated hot stamped steel material according to an embodiment of the present invention comprises a steel base material, an Al-plating layer formed on at least one surface of the steel base material, and a chemical conversion coating formed on the Al-plating layer and containing zinc phosphate-based crystals and Ce-based compounds deposited on surfaces of the zinc phosphate-based crystals, wherein an amount of deposition of the zinc phosphate-based crystals in the chemical conversion coating is, converted to metal Zn, 0.3 to 4.0 g/m² and an area ratio of the Ce-based compounds in the chemical conversion coating is 0.5 to 25%.

In an Al-based plated steel sheet for hot stamping, first, in general, a plating layer containing Al and Si is formed on a steel base material (base iron). By performing hot stamping, Fe diffuses from the steel base material whereby a plating layer containing an alloy layer made of Al—Fe—Si, etc., is formed on the steel base material. Next, in general, this is chemically converted whereby a phosphate film or other chemical conversion coating is formed. Furthermore, a coating is formed by electrodeposition coating, etc. As explained above, it is known that the above alloy layer formed on the steel base material at the time of hot stamping is relatively hard, therefore the Al-plated hot stamped steel material provided with the plating layer containing the alloy layer and furthermore treated by chemical conversion is resistant to defects reaching the steel base material and in general is excellent in corrosion resistance after coating. However, even in such an Al-plated hot stamped steel material, once a defect reaching down to the steel base material is formed, the steel base material will become increasingly corroded and the corrosion resistance after coating is liable to fall.

More specifically, if a defect reaching down to the steel base material is formed at an Al-plated hot stamped steel material, plating corrosion where the exposed part of the steel base material acts as the cathode and the Al-plated part acts as the anode will occur at the interface of the steel base material and the plating. In addition, at the exposed part of the steel base material, the cathodic reaction of the dissolved oxygen ($O_2+2H_2O+4e^- \rightarrow 4OH^-$) will proceed fast, therefore in relation to this, sometimes corrosion at the interface of the steel base material and plating will progress and coating film blisters and other phenomena will arise.

Therefore, to suppress the occurrence of such coating film blisters, etc., the inventors studied the constituents in a chemical conversion coating obtained by chemical conversion of an Al-plated hot stamped steel material provided with a surface treated layer containing zinc (Zn). As a result, the inventors discovered that it is effective to include cerium (Ce) as a corrosion inhibitor in the chemical conversion coating. Explaining this more specifically, the inventors discovered that by adding Ce to a surface treated layer containing Zn and chemically converting this, a chemical conversion coating containing zinc phosphate-based crystals and Ce-based compounds deposited on the surface of the zinc phosphate-based crystals is formed and, furthermore, and that by suitably controlling the amounts of deposition of these, etc., even if a defect reaching the steel base material is formed in the Al-plated hot stamped steel material, Ce can be eluted from the above Ce-based compounds at the defect part so as to form a protective film at the cathodic reaction region of the exposed part of the steel base material, therefore it becomes possible to suppress progression of the cathodic reaction at the exposed part of the steel base material. As a result, the inventors discovered that it is possible to obtain an Al-plated hot stamped steel material in which occurrence of coating film blisters, etc., is remarkably inhibited and in which corrosion resistance after coating, in particular long term corrosion resistance after coating, is excellent.

While not intending to be constrained to any specific theory, it is believed that at the above defect part, Ce ions, in particular trivalent and/or tetravalent Ce ions, are eluted from the Ce-based compounds. Further, it is believed that the eluted Ce ions move toward the exposed part of the steel base material which has become an alkali environment due to progression of the cathodic reaction ($O_2+2H_2O+4e^- \rightarrow 4OH^-$) so as to maintain electrical neutrality. Here, Ce ions are stably present in an alkali environment in the form of hydroxides, therefore precipitate as cerium hydroxide consisting of $Ce(OH)_3$ and/or $Ce(OH)_4$. Further, it is believed that this precipitated film acts as a protective film and inhibits further progression of the cathodic reaction at the exposed part of the steel base material. Below, the constitution of the Al-plated hot stamped steel material according to an embodiment of the present invention will be explained in detail.

[Steel Base Material]

The steel base material according to an embodiment of the present invention may be any steel material having a thickness and chemical composition generally used in hot stamped bodies. More particularly, the present invention, as described above, has as its object the provision of improved corrosion resistance after coating in an Al-plated hot stamped steel material treated by chemical conversion after hot stamping and achieves that object by forming on the Al-plating layer a chemical conversion coating containing zinc phosphate-based crystals and Ce-based compounds deposited on the zinc phosphate-based crystals and furthermore suitably controlling the amount of deposition of the zinc phosphate-based crystals and the area ratio of the Ce-based compounds. Therefore, the chemical composition of the steel base material is not an essential technical feature in achieving the object of the present invention, therefore is not particularly limited and may be suitably determined within the range generally used in hot stamped bodies. Below, the preferable chemical composition of the steel base material according to an embodiment of the present invention will be explained in detail, but these explanations are intended as simple illustrations and are not intended to limit the present invention to one using a steel base material having such a specific chemical composition. For example, as such a steel base material, while not particularly limited to this, a steel material having a 0.3 to 2.3 mm thickness and/or containing a chemical composition comprised of, by mass %, C: 0.01 to 0.55%, Si: 2.00% or less, Mn: 0.01 to 3.50%, P: 0.100% or less, S: 0.050% or less, Al: 0.001 to 0.100%, N: 0.020% or less, and a balance of Fe and impurities can be mentioned. Below, the constituents contained in the above steel base material which is preferably applied in the Al-plated hot stamped steel material according to an embodiment of the present invention will be explained in more detail. In the following explanation, the "%" relating to the contents of the constituents means "mass %" unless otherwise indicated.

[C: 0.01 to 0.55%]

Carbon (C) is an element unavoidably contained in steel and/or included so as to secure the targeted mechanical strength. Excessively reducing the C content causes the refining costs to increase, therefore the C content is preferably 0.01% or more. Further, if the C content is low, a need arises to include other alloy elements in large amounts so as to secure the mechanical strength, therefore from the viewpoint of securing the mechanical strength, the C content is preferably 0.05% or more, 0.10% or more, or 0.20% or more. On the other hand, if including C in excess, the steel material can be made further harder, but becomes brittle and sometimes hot dip cracks form. Therefore, the C content is preferably 0.55% or less. From the viewpoint of preventing hot dip cracks, the content is more preferably 0.50% or less, 0.40% or less, or 0.30% or less.

[Si: 2.00% or Less]

Silicon (Si) is an element which is added as a deoxidizer and otherwise unavoidably included in the refining process of steel and an element having the effect of improving strength. The Si content may be 0%, but from the viewpoint of improving strength, it is preferably 0.01% or more. For example, the Si content may be 0.05% or more or 0.10% or more. On the other hand, excessive inclusion of Si sometimes causes a drop in ductility in the hot rolling step at the time of production of steel sheet or as a result causes deterioration of the surface properties. For this reason, the Si content is preferably 2.00% or less. For example, the Si content may be 1.50% or less or 1.00% or less. Further, Si is an easily oxidizable element. It forms an oxide film on the steel sheet surface, therefore if the Si content is relatively high, at the time of hot dip coating, there is a possibility of the wettability falling and nonplating defects arising. Therefore, more preferably, the Si content is 0.60% or less.

[Mn: 0.01 to 3.50%]

Manganese (Mn) also, like Si, is an element which is added as a deoxidizer and otherwise unavoidably included in the refining process of steel, but has the effects of improving the strength and improving the hardenability and, furthermore, has the effect of suppressing the hot embrittlement due to S. Inclusion of 0.01% or more is preferable. For example, the Mn content may be 0.10% or more, 0.20% or more, 0.30% or more, 0.40% or more, or 0.50% or more. On the other hand, if excessively including Mn, sometimes deterioration of the uniformity of quality due to segregation at the time of casting, excessive hardening of the steel, and a drop in the ductility at the time of hot and cold working are invited, therefore the Mn content is preferably 3.50% or less. For example, the Mn content may be 3.00% or less, 2.00% or less or 1.00% or less.

[P: 0.100% or Less]

Phosphorus (P) is an unavoidably contained element, but is also a solution strengthening element and is an element which can improve the strength of a steel material at relatively low cost. However, excessive inclusion of P sometimes invites a drop in toughness, therefore the P content is preferably 0.100% or less. For example, the P content may be 0.050% or less or 0.020% or less. On the other hand, the lower limit of the P content may be 0%, but from the refining limit is preferably 0.001%. For example, the P content may be 0.003% or more or 0.005% or more.

[S: 0.050% or Less]

Sulfur (S) is also an unavoidably included element. It forms inclusions as MnS which act as starting points for breakage and sometimes harm ductility and toughness and become a cause of inferior workability. For this reason, the lower the S content, the more preferable. 0.050% or less is more preferable. For example, the S content may be 0.020% or less or 0.010% or less. On the other hand, the lower limit of the S content may be 0%, but from the costs of production is preferably 0.001%. For example, the S content may be 0.002% or more or 0.003% or more.

[Al: 0.001 to 0.100%]

Aluminum (Al) is an element used as a deoxidizer at the time of steelmaking. From the refining limit, the lower limit of the Al content is preferably 0.001%. For example, the Al content may be 0.005% or more or 0.010% or more. Further, Al is an element obstructing plateability, therefore the upper limit of the Al content is preferably 0.100%. For example, the Al content may be 0.080% or less or 0.050% or less.

[N: 0.020% or Less]

Nitrogen (N) is also an unavoidably included element. However, if too large a content, an increase in the production costs may be expected, therefore the upper limit of the N content is preferably 0.020%. For example, the N content may be 0.015% or less or 0.010% or less. On the other hand, the lower limit of the N content may be 0%, but from the cost in production is preferably 0.001%. For example, the N content may be 0.002% or more or 0.003% or more.

The basic chemical composition of the steel base material suitable for use in the present invention is as explained above. Furthermore, the steel base material may optionally contain one or more of Ti: 0 to 0.100%, B: 0 to 0.0100%, Cr: 0 to 1.00%, Ni: 0 to 5.00%, Mo: 0 to 2.000%, Cu: 0 to 1.000%, Nb: 0 to 1.000%, Sn: 0 to 1.000%, Ca: 0 to 0.1000%, and REM: 0 to 0.0100%. Below, these optional elements will be explained in detail.

[Ti: 0 to 0.100%]

Titanium (Ti) is one of the strengthening elements and an element improving the heat resistance of the Al-based plating layer. The Ti content may be 0%, but to obtain the effect of improvement of the strength or improvement of the heat resistance, the Ti content is preferably 0.001% or more. For example, the Ti content may be 0.005% or more, 0.010% or more, or 0.015% or more. On the other hand, if excessively including Ti, for example, carbides and nitrides are formed leading to softening of the steel material, therefore the Ti content is preferably 0.100% or less. For example, the Ti content may be 0.080% or less or 0.050% or less.

[B: 0 to 0.0100%]

Boron (B) is an element having the effect of acting to improve the strength of the steel material at the time of hardening. The B content may be 0%, but to obtain such an effect, the B content is preferably 0.0001% or more. The B content may be 0.0003% or more, 0.0010% or more, or 0.0020% or more. On the other hand, if excessively including B, inclusions (for example, BN, borocarbides, etc.) are formed resulting in embrittlement and the fatigue strength is liable to be lowered. Therefore, the B content is preferably 0.0100% or less. The B content may be 0.0080% or less or 0.0060% or less.

[Cr: 0 to 1.00%]

Chrome (Cr) has the effect of suppressing the formation of nitrides formed at the interface of the Al-based plating layer which would cause the Al-based plating layer to peel off. Further, Cr is also an element improving the wear resistance and improving the hardenability. The Cr content may be 0%, but to obtain these effects, the Cr content is preferably 0.01% or more. The Cr content may be 0.05% or more or 0.10% or more. On the other hand, if excessively including Cr, not only do the above effects become saturated, but also the production costs of the steel material rise. Therefore, the Cr content is preferably 1.00% or less. The Cr content may be 0.80% or less or 0.50% or less.

[Ni: 0 to 5.00%]

Nickel (Ni) has the effect of improving the hardenability at the time of hot pressing and also has the effect of raising the corrosion resistance of the steel material itself. The Ni content may be 0%, but to obtain these effects, the Ni content is preferably 0.01% or more. The Ni content may be 0.05% or more or 0.10% or more. On the other hand, if excessively including Ni, not only do the above effects become saturated, but also the production costs of the steel material rise. Therefore, the Ni content is preferably 5.00% or less. The Ni content may be 3.00% or less or 2.00% or less.

[Mo: 0 to 2.000%]

Molybdenum (Mo) has the effect of improving the hardenability at the time of hot pressing and also has the effect of raising the corrosion resistance of the steel material itself. The Mo content may be 0%, but to obtain these effects, the Mo content is preferably 0.001% or more. The Mo content may be 0.005% or more, 0.010% or more, or 0.100% or more. On the other hand, if excessively including Mo, not only do the above effects become saturated, but also the production costs of the steel material rise. Therefore, the Mo content is preferably 2.000% or less. The Mo content may be 1.500% or less or 1.000% or less.

[Cu: 0 to 1.000%]

Copper (Cu) has the effect of improving the hardenability at the time of hot pressing and also has the effect of raising the corrosion resistance of the steel material itself. The Cu content may be 0%, but to obtain these effects, the Cu content is preferably 0.001% or more. The Cu content may be 0.005% or more, 0.010% or more, or 0.050% or more. On the other hand, if excessively including Cu, not only do the above effects become saturated, but also the production costs of the steel material rise. Therefore, the Cu content is preferably 1.000% or less. The Cu content may be 0.500% or less or 0.200% or less.

[Nb: 0 to 1.000%]

Niobium (Nb) is an element contributing to precipitation strengthening, etc. The Nb content may be 0%, but to obtain this effect, the Nb content is preferably 0.001% or more. For example, the Nb content may be 0.005% or more or 0.010% or more. On the other hand, even if excessively including Nb, the effect becomes saturated. Therefore, including Nb in the steel material more than necessary is liable to invite just a rise in production costs. Therefore, the Nb content is preferably 1.000% or less. The Nb content may be 0.500% or less or 0.200% or less.

[Sn: 0 to 1.000%]

Tin (Sn) is an element effective for improving the corrosion resistance. The Sn content may be 0%, but to obtain such an effect, the Sn content is preferably 0.001% or more. The Sn content may be 0.005% or more or 0.010% or more. On the other hand, even if excessively including Sn, the effect becomes saturated. Therefore, including Sn in the steel material more than necessary is liable to invite just a rise in production costs. Therefore, the Sn content is preferably 1.000% or less. The Sn content may be 0.500% or less or 0.200% or less.

[Ca: 0 to 0.1000%]

Calcium (Ca) is an element for controlling inclusions. The Ca content may be 0%, but to obtain such an effect, the Ca content is preferably 0.0001% or more. The Ca content may be 0.0002% or more, 0.0010% or more, or 0.0020% or more. On the other hand, if excessively including Ca, the alloy cost becomes higher, therefore the Ca content is preferably 0.1000% or less. The Ca content may be 0.0500% or less or 0.0100% or less.

[REM: 0 to 0.0100%]

REM (rare earth metals) are elements for controlling inclusions. The REM content may be 0%, but to obtain such an effect, the REM content is preferably 0.0001% or more. The REM content may be 0.0002% or more, 0.0005% or more, or 0.0010% or more. On the other hand, if excessively containing REM, the alloy cost rises, therefore the REM content is preferably 0.0100% or less. The REM content may be 0.0080% or less or 0.0050% or less. REM means one or more elements selected from the group consisting of scandium (Sc) of atomic number 21, yttrium (Y) of atomic number 39, and the lanthanoids of lanthanum (La) of atomic number 57 to lutetium (Lu) of atomic number 71. The REM content is the total content of these elements.

Furthermore, the steel base material according to an embodiment of the present invention may suitably contain other elements in a range not detracting from the effect of the present invention explained in this Description in addition to or in place of the above optional elements. For example, W, V, Sb, and other elements may be suitably included.

In the steel base material according to an embodiment of the present invention, the balance other than the above constituents consists of Fe and impurities. Here, the impurities in the steel base material are constituents, etc., entering due to various factors in the production process such as the ore, scrap or other raw materials when industrially producing the Al-plated hot stamped steel material according to an embodiment of the present invention.

[Al-Plating Layer]

According to the present invention, an Al-plating layer is formed on at least one side of the steel base material, i.e., on one side or both sides of the steel base material. In the present invention, the "Al-plating layer" means a plating layer in which the chemical composition right after plating mainly consists of Al, more specifically, a plating layer in which the chemical composition right after plating comprises more than 50 mass % of Al. If performing hot stamping, Fe diffuses from the steel base material to inside the Al-plating layer, therefore the chemical composition of the Al-plating layer changes depending on the heat treatment conditions (heating temperature, holding time, etc.) at the time of hot stamping. For example, if the amount of diffusion of Fe from the steel base material to the Al-plating layer becomes greater, even if the Al content right after plating is more than 50 mass %, the Al content after hot stamping will fall from that. Therefore, the chemical composition of the Al-plating layer according to an embodiment of the present invention after hot stamping does not necessarily have to be Al: more than 50 mass %.

The Al-plating layer according to an embodiment of the present invention preferably contains Si. In general, it is known that, in an Al-based plated steel sheet, at the time of the plating treatment, Fe diffuses from the steel base material and that the diffused Fe reacts with the Al in the plating layer whereby an Al—Fe alloy layer is formed at the interface of the plating layer and the steel base material. An Al—Fe alloy layer is a hard layer, therefore if an Al—Fe alloy layer is excessively formed, for example, the shapeability of the steel sheet at the time of cold working is liable to be impaired. Here, it is known that the Si in the Al-plating layer has the function of suppressing the formation of such an Al—Fe alloy layer. Further, by including Si, the Al-plating layer according to an embodiment of the present invention after hot stamping is alloyed with the Fe diffusing from the steel base material into the Al-plating layer at the time of hot stamping, whereby a relatively hard Al—Fe—Si alloy layer can be included. As a result, in the finally obtained Al-plated hot stamped steel material, it becomes possible to reliably maintain a high resistance even against formation of defects which would reach the steel base material.

Furthermore, the Al-plating layer according to an embodiment of the present invention may also suitably contain other elements in a range not obstructing the effect of the present invention. For example, the Al-plating layer may, in addition to Si, optionally contain Mg, Sr, mischmetal, or other elements for improving the corrosion resistance of the Al-plating layer and/or may contain other elements known to persons skilled in the art as added elements in an Al-plating layer.

In the Al-plating layer according to an embodiment of the present invention, the balance other than the above constituents (i.e., Si, Mg, Ca, Sr, mischmetal, and other elements and/or other added elements known to persons skilled in the art) consists of Al, Fe and impurities. Here, the "impurities" in the Al-plating layer are raw materials first and foremost and other constituents, etc., entering due to various factors in the production process when producing an Al-plating layer (however, excluding Fe eluted from the steel base material into the plating bath and Fe diffusing from the steel base material into the Al-plating layer at the time of hot stamping).

[Chemical Conversion Coating]

Figure 1:
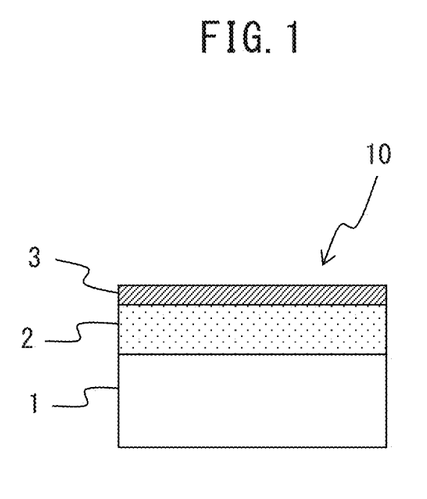
FIG. 1 is a schematic view showing an Al-plated hot stamped steel material according to an embodiment of the present invention.

According to the present invention, the Al-plating layer is formed with a chemical conversion coating containing zinc phosphate-based crystals and Ce-based compounds deposited on the surfaces of the zinc phosphate-based crystals. FIG. 1 is a schematic view showing the Al-plated hot stamped steel material according to an embodiment of the present invention. In FIG. 1, for simplification, only one side part of the Al-plated hot stamped steel material is shown, but naturally the Al-plated hot stamped steel material according to an embodiment of the present invention may have Al-plating layers, etc., on both sides not on just one side of the steel base material. Referring to FIG. 1, it will be understood that the Al-plated hot stamped steel material 10 according to an embodiment of the present invention has a structure where one side of the steel base material (base iron) 1 is formed with the Al-plating layer 2 and where the Al-plating layer 2 is formed with the chemical conversion coating 3 containing zinc phosphate-based crystals and Ce-based compounds deposited on the surfaces of the zinc phosphate-based crystals.

It is known that, in general, by forming a surface treated layer containing ZnO or other specific compounds on an Al-plating layer, it is possible to improve the chemical conversion ability of an Al-based plated steel sheet, coating film adhesion, slidability, etc. However, even in an Al-plated hot stamped steel material obtained by hot stamping such an Al-based plated steel sheet and furthermore treating it by chemical conversion and/or electrodeposition coating, if a defect were formed which would reach the steel base material, as explained earlier, sometimes plating corrosion where the exposed part of the steel base material would act as a cathode and the Al-plated part would act as an anode would occur at the interface of the steel base material and the plating. In addition, at the exposed part of the steel base material, the cathodic reaction of the dissolved oxygen ($O_2 + 2H_2O + 4e^- \rightarrow 4OH^-$) would quickly proceed, therefore in relation to this, sometimes corrosion would progress at the interface of the steel base material and plating and coating film blisters and other phenomena would arise.

As opposed to this, in the Al-plated hot stamped steel material according to an embodiment of the present invention, the chemical conversion coating containing the zinc phosphate-based crystals further contains Ce-based compounds deposited on the zinc phosphate-based crystals. Due to this, even if a defect were formed which would reach the Al-plated hot stamped steel material, it is possible to make the cerium constituent, more specifically the Ce ions, in particular the trivalent and/or tetravalent Ce ions, elute from the defect part and form a protective film at the cathodic reaction region of the exposed part of the steel base material, more specifically a protective film comprised of $Ce(OH)_3$ and/or $Ce(OH)_4$, therefore it becomes possible to suppress the further progression of the cathodic reaction at the exposed part of the steel base material. As a result, according to the present invention, it is possible to obtain an Al-plated hot stamped steel material remarkably suppressed in occurrence of coating film blisters, etc., and excellent in corrosion resistance after coating. The chemical conversion coating according to an embodiment of the present invention may also contain zinc oxide (for example zinc oxide particles) and other Zn-containing compounds. That is to say, as explained in detail later, the chemical conversion coating is, for example, formed by chemical conversion of a film containing Zn-containing compounds, therefore sometimes at the time of the chemical conversion, some of the Zn-containing compounds will not react but will remain in the final chemical conversion coating.

[Zinc Phosphate-Based Crystals]

If the amount of deposition of the zinc phosphate-based crystals in the chemical conversion coating is too small, sometimes the effect of improvement of the coating film adhesion, etc., cannot be sufficiently manifested. In such a case, a drop in the corrosion resistance after coating is invited. Therefore, the amount of deposition of the zinc phosphate-based crystals is, converted to metal Zn, 0.3 g/m$^2$ or more, preferably 1.0 g/m$^2$ or more, more preferably 1.5 g/m$^2$ or more, most preferably 2.0 g/m$^2$ or more. On the other hand, if the amount of deposition of the zinc phosphate-based crystal is too large, the chemical conversion coating will become too thick or the space between the zinc phosphate-based crystals will become too small and sometimes elution of Ce to the cathodic reaction region of the exposed part of the steel base material will be inhibited. Therefore, the amount of deposition of the zinc phosphate-based crystals may be, converted to metal Zn, 4.0 g/m$^2$ or less, for example, 3.5 g/m$^2$ or less, 3.0 g/m$^2$ or less, or 2.5 g/m$^2$ or less. In the present invention, the amount of deposition of the zinc phosphate-based crystals in the chemical conversion coating is determined by measuring the amount of deposition of metal Zn in the chemical conversion coating by fluorescent X-ray analysis based on JIS G 3314: 2011.

The zinc phosphate-based crystals may be any suitable compounds known to persons skilled in the art. While not particularly limited, for example, at least one compound of hopeite ($Zn_3 (PO_4)_2.4H_2O$) and phosphophyllite ($Zn_2Fe^{2+} (PO_4)_2.4H_2O$) is preferably contained. By including these compounds, high coating film adhesion can be obtained and in turn the corrosion resistance after coating can be reliably improved. The Al-plated hot stamped steel material according to an embodiment of the present invention may be used as chemically converted or may be used coated by electrodeposition coating, etc., after chemical conversion. In a specific embodiment, for example, in the Al-plated hot stamped steel material used as chemically converted, sometimes the zinc phosphate-based crystals which had been present in the chemical conversion coating as hopeite will change, at least in part or in total, to $Zn_6Al_2 (OH)_{16} CO_3.4H_2O$ after the electrodeposition coating. Here, in the present invention, the "zinc phosphate-based crystals" include not only hopeite and phosphophyllite and other compounds, but also Zn-containing compounds derived from these compounds, i.e., $Zn_6Al_2 (OH)_{16} CO_3.4H_2O$ derived from hopeite, etc.

[Ce-Based Compounds]

Figure 2:
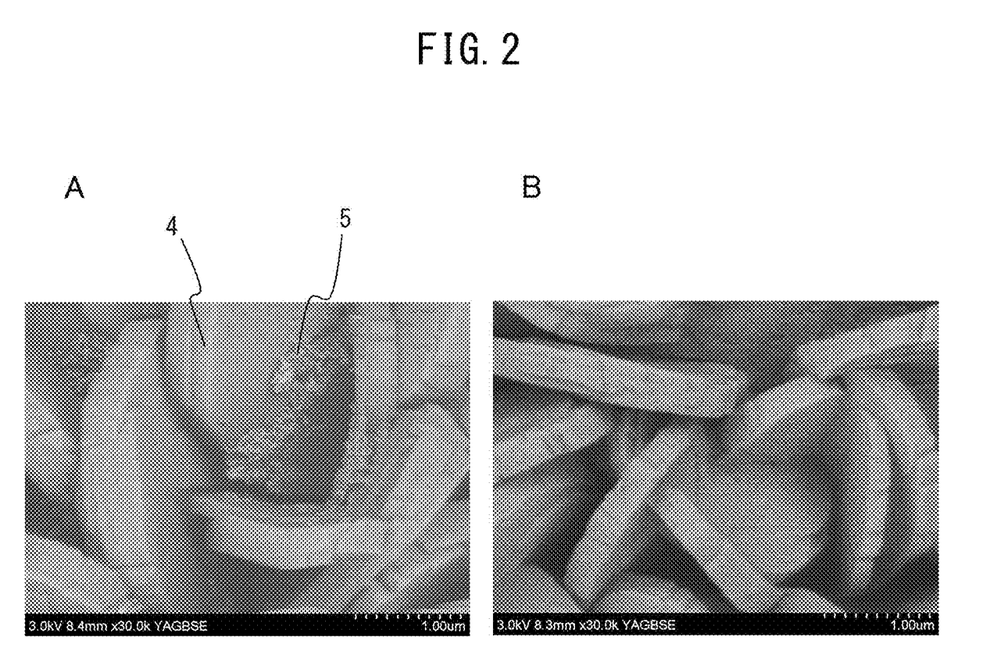
FIG. 2A shows an SEM image of a chemical conversion coating according to an embodiment of the present invention containing zinc phosphate-based crystals and Ce-based compounds and FIG. 2B shows a cross-sectional SEM image of a chemical conversion coating containing only zinc phosphate-based crystals and not containing Ce-based compounds.

In the Al-plated hot stamped steel material according to an embodiment of the present invention, as stated above, by mainly making the amount of deposition of the zinc phosphate-based crystals in the chemical conversion coating suitable, the coating film adhesion is improved while the corrosion resistance after coating is improved by the Ce-based compounds. Here, the Ce-based compounds are present in a state deposited on the surfaces of the zinc phosphate-based crystals in the chemical conversion coating. More specifically, the chemical conversion coating has a structure of zinc phosphate-based crystals on the surface of which Ce-based compounds smaller than the zinc phosphate-based crystals are deposited. FIGS. 2A and 2B show images observed by a scan electron microscope (SEM) of the chemical conversion coating. FIG. 2A shows an SEM image of the chemical conversion coating according to an embodiment of the present invention containing zinc phosphate-based crystals and Ce-based compounds, while FIG. 2B shows a cross-sectional SEM image of a chemical conversion coating containing only zinc phosphate-based crystals and not containing Ce-based compounds.

If referring to FIGS. 2A and 2B, it will be understood that regardless of the presence or absence of the Ce-based compounds, the zinc phosphate-based crystals 4 are present in a state relatively densely aggregated. Further, if referring to FIG. 2A, it will be understood that the chemical conversion coating according to an embodiment of the present invention, as shown by the arrow marks, has a structure where the surfaces of the zinc phosphate-based crystals 4 have Ce-based compounds 5 smaller than the zinc phosphate-based crystals deposited on them. By having such a structure, the zinc phosphate-based crystals 4 can be made to aggregate relatively densely with each other and the space between the zinc phosphate-based crystals 4 can be made smaller, therefore it is possible to make the elution of Ce from the Ce-based compounds 5 deposited on these crystals proceed relatively slowly. Therefore, such a structure is extremely advantageous from the viewpoint of achieving long term corrosion resistance after coating. In the chemical conversion coating according to an embodiment of the present invention, it is sufficient that at least part of the Ce-based compounds 5 be deposited on the surfaces of the zinc phosphate-based crystals 4, i.e., there is no need for all of the Ce-based compounds 5 to be deposited on the surfaces of the zinc phosphate-based crystals 4. For example, part of the Ce-based compounds 5 may be taken into the inside of the zinc phosphate-based crystals 4. However, if Ce-based compounds 5 are taken into the inside of the zinc phosphate-based crystals 4, elution of Ce from the Ce-based compounds 5 to the cathodic reaction region of the exposed part of the steel base material becomes relatively difficult, therefore sufficient corrosion resistance after coating is liable to be unable to be achieved. Therefore, from the viewpoint of making the corrosion resistance after coating rise, making the chemical conversion coating contain Ce-based compounds deposited on the surfaces of the zinc phosphate-based crystals becomes extremely important.

In the Al-plated hot stamped steel material according to an embodiment of the present invention, the area ratio of the Ce-based compounds in the chemical conversion coating is controlled to 0.5 to 25%. If the area ratio of the Ce-based compounds in the chemical conversion coating is low, the effect obtained by addition of the Ce-based compounds, i.e., the effect of improvement of the corrosion resistance after coating, cannot be sufficiently manifested. On the other hand, if the area ratio of the Ce-based compounds in the chemical conversion coating is too large, the amount of deposition of the elutable Ce-based compounds in the chemical conversion coating will become greater, i.e., the amount of elution of Ce ions will become greater, therefore the bonding interface with the coating film will be reduced, the coating film adhesion will fall, and, as a result, a drop in the corrosion resistance after coating will be invited. By controlling the area ratio of the Ce-based compounds in the chemical conversion coating to 0.5 to 25% in range, it becomes possible to maintain the coating film adhesion while making the effect of improvement of the corrosion resistance after coating obtained due to addition of the Ce-based compounds be manifested reliably. For example, the area ratio of the Ce-based compounds in the chemical conversion coating may be 1% or more, 3% or more, 5% or more, or 10% or more and/or may be 22% or less, 20% or less, 18% or less, or 15% or less.

In the present invention, the area ratio of the Ce-based compounds in the chemical conversion coating is determined by measuring the surface of the chemical conversion coating by an EPMA (electron probe microanalyzer) under conditions of a beam diameter of 10 μm, a step interval of 10 μm, and number of steps of 500 points×500 points and calculating the percentage of the Ce-based compounds in the total (500 points×500 points).

The amount of deposition of the Ce-based compounds in the chemical conversion coating is preferably, converted to metal Ce, 1.0 to 280 mg/m$^2$. If the amount of deposition of the Ce-based compounds in the chemical conversion coating is small, in the same way as the case of the area ratio of Ce-based compounds, in some cases the effect obtained by addition of Ce-based compounds, i.e., the effect of improvement of the corrosion resistance after coating, cannot be sufficiently manifested. On the other hand, if the amount of deposition of the Ce-based compounds in the chemical conversion coating is too large, in the chemical conversion coating, the amount of elution of Ce ions becomes greater, therefore sometimes the bonding interface with the coating film will be reduced, the coating film adhesion will fall, and, as a result, a drop in the corrosion resistance after coating will be invited. In the Al-plated hot stamped steel material according to an embodiment of the present invention, it is sufficient to control the area ratio of the Ce-based compounds in the chemical conversion coating to 0.5 to 25% in range. Additionally controlling the amount of deposition of the Ce-based compounds is not demanded, but by controlling the area ratio of the Ce-based compounds in the chemical conversion coating to within the above range and additionally controlling the amount of deposition of the Ce-based compounds to 1.0 to 280 mg/m$^2$ in range, it becomes possible to maintain the coating film adhesion while more reliably and sufficiently manifesting the effect of improvement of the corrosion resistance after coating obtained by addition of the Ce-based compounds.

For example, the amount of deposition of the Ce-based compounds in the chemical conversion coating may be 5 mg/m$^2$ or more, 10 mg/m$^2$ or more, 30 mg/m$^2$ or more, 50 mg/m$^2$ or more, or 100 mg/m$^2$ or more and/or 250 mg/m$^2$ or less, 220 mg/m$^2$ or less, 200 mg/m$^2$ or less, 180 mg/m$^2$ or less, or 150 mg/m$^2$ or less. In the present invention, the amount of deposition of the Ce-based compounds in the chemical conversion coating is determined by measuring the amount of deposition of metal Ce in the chemical conversion coating by fluorescent X-ray analysis based on JIS G 3314: 2011.

As the Ce-based compounds, any suitable compounds able to elute Ce ions may be used. While not particularly limited, for example, at least one compound selected from the group consisting of cerium oxide ($CeO_2$), cerium hydroxide (III) ($Ce(OH)_3$), and cerium hydroxide (IV) ($Ce(OH)_4$) is preferably included. Including at least one compound of $Ce(OH)_3$ and $Ce(OH)_4$ is more preferable and including $Ce(OH)_3$ is most preferable. By including these Ce-based compounds, even if a defect were formed in the Al-plated hot stamped steel material which would reach the steel base material, it is possible to make the trivalent and/or tetravalent Ce ions elute from the Ce-based compounds at the defect part and form a protective film comprised of $Ce(OH)_3$ and/or $Ce(OH)_4$ at the cathodic reaction region of the exposed part of the steel base material, therefore it becomes possible to suppress the further progression of the cathodic reaction at the exposed part of the steel base material.

Explained more specifically, for example, if a defect were formed in the Al-plated hot stamped steel material which would reach the steel base material, if $Ce(OH)_3$ and/or $Ce(OH)_4$ were present as Ce-based compounds in the chemical conversion coating, it is believed that the progression of corrosion would be inhibited by the following mechanism. First, if iron corrodes, the corrosive environment becomes acidic, therefore this acidity would drive the elution of Ce ions from the $Ce(OH)_3$ and/or $Ce(OH)_4$ in the chemical conversion coating. Next, the eluted Ce ions would move to maintain electrical neutrality to the exposed part of the steel base material becoming the alkali environment due to the progression of the cathodic reaction ($O_2+2H_2O+4e^- \rightarrow 4OH^-$). Here, Ce ions are stably present in an alkali environment in the form of hydroxides, therefore again cerium hydroxide comprised of $Ce(OH)_3$ and/or $Ce(OH)_4$ is formed and precipitates or this precipitated film acts as a protective film to inhibit further progression of the cathodic reaction at the exposed part of the steel base material.

On the other hand, if $CeO_2$ is present in the chemical conversion coating as the Ce-based compound, since $CeO_2$ can elute Ce ions in particular without restriction as to being in an acidic environment or alkali environment, after eluting Ce ions, it is possible to inhibit the further progression of the cathodic reaction at the exposed part of the steel base material by a mechanism similar to the case of including $Ce(OH)_3$ and/or $Ce(OH)_4$ as Ce-based compounds.

[Method for Producing Al-Plated Hot Stamped Steel Material]

Next, the preferable method for producing the Al-plated hot stamped steel material according to an embodiment of the present invention will be explained. The following explanation is intended to illustrate the characteristic method for producing the Al-plated hot stamped steel material according to an embodiment of the present invention and is not intended to limit the Al-plated hot stamped steel material to one produced by the method of production such as explained below.

For example, the Al-plated hot stamped steel material according to an embodiment of the present invention having the above features can be produced by a method comprising
   forming an Al-plating layer on at least one side of a steel sheet,
   hot pressing the steel sheet, and
   forming a chemical conversion coating on the hot-pressed steel material. Below, the steps of this method of production will be explained in detail.

[Step of Formation of Al-Plating Layer]

In the step for forming the Al-plating layer, a steel sheet having a predetermined thickness and composition is formed on at least one side with an Al-plating layer by the Sendzimir process, etc. The steel sheet is not particularly limited, but, for example, as explained above in relation to the steel base material, it may be one having a thickness of 0.3 to 2.3 mm and/or having a chemical composition comprised of, by mass %, C: 0.01 to 0.55%, Si: 2.00% or less, Mn: 0.01 to 3.50%, P: 0.100% or less, S: 0.050% or less, Al: 0.001 to 0.100%, N: 0.020% or less, and a balance of Fe and impurities and optionally further containing one or more of Ti: 0 to 0.100%, B: 0 to 0.0100%, Cr: 0 to 1.00%, Ni: 0 to 5.00%, Mo: 0 to 2.000%, Cu: 0 to 1.000%, Nb: 0 to 1.000%, Sn: 0 to 1.000%, Ca: 0 to 0.1000%, and REM: 0 to 0.0100%.

More specifically, first, the above steel sheet, in particular cold-rolled steel sheet, is annealed in an $N_2$—$H_2$ mixed gas atmosphere at a predetermined temperature and time, for example a temperature of 750 to 850° C. for 10 seconds to 5 minutes, then is cooled down to the vicinity of a plating bath temperature in a nitrogen atmosphere or other inert atmosphere. Next, this steel sheet is dipped in an Al plating bath containing 3 to 15 mass % of Si at a 600 to 750° C. in temperature for 0.1 to 60 seconds, then is pulled out and immediately blown with $N_2$ gas or air by the gas wiping method so as to adjust the amount of deposition of Al plating to a predetermined range, for example, 40 to 200 $g/m^2$ in range on the two sides. Finally, the steel sheet is blown with air, etc., to cool it whereby an Al-plating layer is formed on one side or both sides of the steel sheet.

[Hot Pressing Step]

Next, the steel sheet on which the Al-plating layer is formed is hot pressed. The above hot pressing can be performed by any method known to a person skilled in the art. While not particularly limited, for example, the Al-plated steel sheet can be heated by an approximately 3 to 300° C./s rate of temperature rise up to the Ac3 point or more in temperature, generally approximately 850 to 1000° C. in temperature, then hot pressed over a predetermined time. Here, with a less than 850° C. heating temperature, a sufficient hardness may not be obtained, therefore this is not preferable. Further, if the heating temperature is more than 1000° C., due to the excessive diffusion of Fe from the steel base material to the Al-plating layer, sometimes the alloying of the Al and Fe progresses too much. In such a case, a drop in the corrosion resistance after coating is sometimes invited, therefore this is not preferable. Further, the hardening by the die at the time of hot pressing is not particularly limited, but, for example, after leaving the heating furnace, the steel sheet is cooled by an average cooling rate of 30° C./s until the temperature falls to 400° C.

[Step for Forming Chemical Conversion Coating]

Next, the Al-plating layer is formed with a chemical conversion coating. The chemical conversion coating can be formed by various methods. While not particularly limited, for example, it may be formed by forming a coating containing Zn-containing compounds and/or Ce-containing compounds after the hot pressing step, then chemically converting the coating or may be formed by forming in advance a coating containing Zn-containing compounds and/or Ce-containing compounds before the hot pressing step, then hot pressing, then chemically converting the coating. As a specific example of the former (forming coating containing Zn-containing compounds and/or Ce-containing compounds after the hot pressing step, then chemically converting), for example, it is possible to, first, after the hot pressing step, electrolytically plate the Al-plating layer with Zn, then spray coat a predetermined amount of an aqueous solution of a cerium oxide sol and allow it to naturally dry, then perform ordinary chemical conversion to thereby form crystalline zinc phosphate-based crystals from the Zn-containing compounds and form a chemical conversion coating having a structure comprised of zinc phosphate-based crystals on the surface of which Ce-based compounds are deposited. In this case, the amount of deposition of Zn converted to metal can be adjusted by the number of charged coulombs at the time of electrolytic plating. Further, the area ratio and/or amount of deposition of the Ce-based compounds can be controlled to the desired ranges by suitably adjusting the spray time, spray pressure, concentration, etc., of the aqueous solution of cerium oxide sol. As a specific example of the latter (forming in advance a coating containing Zn-containing compounds and/or Ce-containing compounds before the hot pressing step, then hot pressing, then chemically converting the coating), for example, it is possible to coat the Al-plating layer before the hot pressing step with only a gel aqueous solution of zinc oxide, then perform hot pressing and chemical conversion, then finally spray coat the steel material surface with cerium (III) carbonate octahydrate, etc., and allow it to naturally dry to thereby form a chemical conversion coating according to an embodiment of the present invention. In the specific example of the latter as well, the amount of deposition of Zn converted to metal can be controlled to the desired range by suitably adjusting the concentration, amount of coating, etc., of the gel aqueous solution of the zinc oxide. Similarly, the area ratio and/or amount of deposition of the Ce-based compounds can be controlled to the desired ranges by suitably adjusting the spray time, spray pressure, concentration, etc., of the cerium (III) carbonate octahydrate, etc. In the case of any of the above, chemical conversion can be performed under any suitable conditions known to persons skilled in the art.

For example, in any of the above examples, if dipping the steel material in an aqueous solution containing Ce-based compounds so as to coat the Ce-based compounds instead of spray coating the Ce-based compounds, the amount of deposition of the Ce-based compounds would become too great and control to within a suitable range would no longer be possible. As a result, in the finally obtained chemical conversion coating, the area ratio of the Ce-based compounds would greatly exceed 25% and sometimes reach 100%. In such a case, in the chemical conversion coating, the amount of elution of Ce ions would become greater, therefore the bonding interface with the coating film would be reduced and a drop in the coating film adhesion would be invited. Further, if coating, etc., a steel material with a mixed treatment solution containing Zn-containing compounds and Ce-containing compounds as well, in the same way, the amount of deposition of the Ce-based compounds would become too great and in the finally obtained chemical conversion coating, the area ratio of the Ce-based compounds would greatly exceed 25% and sometimes reach 100%. Further, for example, if chemically converting a coating not containing Zn-containing compounds, etc., amorphous phosphate compounds would be formed and it would not be possible to form the chemical conversion coating containing zinc phosphate-based crystals according to an embodiment of the present invention.

(Coating Treatment)

The chemically converted Al-plated hot stamped steel material may, in accordance with need, by coated by electrodeposition coating, etc. The coating treatment can be performed under any suitable conditions known to persons skilled in the art.

The Al-plated hot stamped steel material according to an embodiment of the present invention may be used in the state after chemical conversion or in the state coated, as described above, by electrodeposition coating, etc., after chemical conversion. Furthermore, the Al-plated hot stamped steel material according to an embodiment of the present invention does not change in the constitution of the chemical conversion coating before and after coating and, in addition, does not inherently change in the constitution of the chemical conversion coating even after the coating is removed using a stripper, etc., after coating. Therefore, the Al-plated hot stamped steel material according to an embodiment of the present invention includes not only an Al-plated hot stamped steel material as chemically converted and coated after chemical conversion, but also an Al-plated hot stamped steel material from which the once applied coating is removed.

Below, examples will be used to explain the present invention in more detail, but the present invention is not limited to these examples in any way.

EXAMPLES

In the following examples, steel materials for the Al-plated hot stamped steel material according to the present invention were produced under various conditions and were examined for their coating film adhesion and corrosion resistance after coating.

First, in each example, cold-rolled steel sheet (sheet thickness 1.4 mm) having a chemical composition comprising, by mass %, C: 0.22%, Si: 0.12%, Mn: 1.25%, P: 0.010%, S: 0.005%, Al: 0.040%, N: 0.001%, Ti: 0.020%, B: 0.0030%, and a balance of Fe and impurities was formed on its two sides with Al-plating layers by the Sendzimir process. More specifically, first, the above cold-rolled steel sheet was annealed in an $N_2$—$H_2$ mixed gas ($H_2$ 4%, $N_2$ balance) atmosphere at 800° C. for 1 minute, then was cooled down to the vicinity of the plating bath temperature in a nitrogen atmosphere. Next, this steel sheet was dipped in an Al plating bath containing 9 mass % of Si at a temperature of 670° C. for 3 seconds, then was pulled out and immediately blown with $N_2$ gas by the gas wiping method to adjust the amounts of deposition of Al plating on the two sides to 160 g/m$^2$ (single side 80 g/m$^2$). Next, the steel sheet was blown with air to cool it and thereby form an Al-plating layer on the two sides of the steel sheet.

Next, the cooled Al-plated steel sheet was cut into a 120 mm×200 mm size and loaded into a furnace simulating hot stamping, next was set on a 70 mm×70 mm SiC table with the evaluated surface facing upward and held at 900° C.±10° C. for 1 minute. The Al-plated steel sheet was taken out from the furnace, then was immediately clamped by a stainless steel die and rapidly cooled by an approximately 150° C./s cooling rate. The end parts of the obtained steel material were cut off to obtain from the center part a steel material of 70 mm×150 mm size.

Next, the obtained steel material was dipped in a 10% hydrochloric acid aqueous solution for 5 seconds, then was rinsed and cleaned as pickling treatment. Next, the surfaces of the Al-plating layers were cathodically electrolyzed at 30 A/dm$^2$ in a 50° C. electrolytic Zn plating solution ($Zn_2SO_4$: 200 g/L+$ZnCl_2$: 100 g/L+$(NH_4)_2SO_4$: 30 g/L). The amount of deposition of Zn converted to metal was adjusted by the number of charged coulombs. The obtained electrolytic Zn plating surface was spray coated by an aqueous solution of a predetermined amount of 1% cerium oxide sol (product name Needral, made by Taki Chemical Co., Ltd.) by a suitable spraying time and spraying pressure to give an area ratio of Ce-based compounds of the value shown in Table 1 and then allowed to naturally dry.

Next, the obtained steel material was chemically converted by a chemical conversion solution (PB-SX35 made by Nihon Parkerizing Co., Ltd.). When loading a 70 mm×150 mm steel material to which a thermocouple was welded into a furnace set to 900° C. and measuring the temperature until reaching 900° C. to calculate the average rate of temperature rise, it was 5° C./s. The chemical converted steel material was coated with an electrodeposition coating (Powernix 110 made by Nippon Paint) to a film thickness of 15 μm and baked at 170° C. The obtained steel material was measured for the amount of deposition of the zinc phosphate-based crystals (converted to metal Zn) and the amount of deposition of Ce-based compounds (converted to metal Ce) and the area ratio of Ce-based compounds in the chemical conversion coating and was further evaluated for coating film adhesion and the corrosion resistance after coating.

[Measurement of Amounts of Deposition of Zinc Phosphate-Based Crystals and Ce-Based Compounds in Chemical Conversion Coating]

Each steel material was coated on its coating film surface with a coating film peeling agent (Skeleton NC 651NC made by Natoco Co., Ltd.) by a brush, then wiping off any rise in the coating film by a sponge. Next, the exposed chemical conversion coating was measured for amounts of deposition of metal Zn and metal Ce by fluorescent X-ray analysis based on MS G 3314: 2011 to thereby determine the amounts of deposition of zinc phosphate-based crystals and Ce-based compounds in the chemical conversion coating.

[Measurement of Area Ratio of Ce-Based Compounds in Chemical Conversion Coating]

The area ratio of the Ce-based compounds in the chemical conversion coating was similarly determined by measuring the surface of the chemical conversion coating at the steel material after peeling off the coating film using a coating film peeling agent by an EPMA (electron probe microanalyzer) under conditions of a beam diameter of 10 μm, a current value of $10^{-6}$ A, a step interval of 10 μm, and number of steps of 500 points×500 points and calculating the percentage of the Ce-based compounds (number of points of strength of 10 cps or more) in the total (500 points×500 points).

The amounts of deposition of the zinc phosphate-based crystals and Ce-based compounds and the area ratio of the Ce-based compound shown in Table 1 were measured for a chemical conversion coating in the state after coating once and then peeled off, but these values were equal to the values separately but similarly measured for the steel material as chemically converted.

[Evaluation of Coating Film Adhesion]

The coating film adhesion was evaluated by immersing the coated steel material in 40° C. warm water for 200 hours, then wiping off the moisture by a paper towel, then performing a tape peeling test based on JIS K 5600-5-6: 1999. More specifically, it was evaluated by six stages shown in Table 1 of Chapter 8.3 of that standard. Cases of a score of 0 (edges of cuts completely smooth with no peeling at any of the parts of the lattice) and a score of 1 (slight peeling of coating film at intersecting points of cuts, effects at cross cut parts clearly not more than 5%) were considered passing. On the other hand, a case of a score of 2 or more was considered failing.

[Evaluation of Corrosion Resistance after Coating]

The corrosion resistance after coating was evaluated by performing the SAE J2334 test on the coated steel material and measuring the coating film blister width, more specifically, a coating film was given a cut (defect) by an acrylic cutter. It was checked that the cut reached the steel base. The width of the coating film blister (maximum value at one side) from the cut part after 200 cycles in the SAE J2334 test was measured for the thus confirmed steel material. Here, the smaller the value of the "coating film blister width" in Table 1, the better the corrosion resistance after coating of the steel material meant. In Table 1, as a comparative example, the results of a test of a steel material provided with a chemical conversion coating not containing any Ce-based compounds are also shown (Comparative Example 1 in Table 1). The coating film blister width (maximum value at one side) in the case of performing a similar test on a GA material (hot dip galvannealed steel sheet, amount of deposition on one side 45 g/m$^2$) was 6 mm, therefore in the present test, a coating film blister width of 6 mm or less was deemed passing and one of more than 6 mm was deemed failing. The results are shown in Table 1.

TABLE 1

| | Zinc phosphate-based crystals | | Ce-based compounds | | | | | |
|---|---|---|---|---|---|---|---|---|
| No. | Amount of deposition (converted to Zn) (g/m$^2$) | Type | Area ratio (%) | Amount of deposition (converted to Ce) (mg/m$^2$) | Type | Coating film adhesion | Coating film blister width (mm) | Remarks |
| 1 | 2.2 | Hopeite $Zn_6Al_2(OH)_{16}CO_3 \cdot 4H_2O$ | 0 | 0 | — | 0 | 8 | Comp. ex. |
| 2 | 2.1 | Hopeite | 0.5 | 0.5 | $CeO_2$ $Ce(OH)_3$ | 0 | 6 | Ex. |
| 3 | 2.2 | Hopeite | 1 | 1 | $CeO_2$ $Ce(OH)_3$ $Ce(OH)_4$ | 0 | 6 | Ex. |
| 4 | 2.1 | Hopeite $Zn_6Al_2(OH)_{16}CO_3 \cdot 4H_2O$ | 5 | 5 | $CeO_2$ $Ce(OH)_3$ $Ce(OH)_4$ | 0 | 5 | Ex. |
| 5 | 0.3 | Hopeite | 10 | 30 | $CeO_2$ $Ce(OH)_3$ $Ce(OH)_4$ | 1 | 6 | Ex. |
| 6 | 0.2 | Hopeite $Zn_6Al_2(OH)_{16}CO_3 \cdot 4H_2O$ | 10 | 30 | $Ce(OH)_3$ $Ce(OH)_4$ | 1 | 8 | Comp. ex. |
| 7 | 1.0 | Hopeite | 10 | 30 | $Ce(OH)_3$ $Ce(OH)_4$ | 1 | 6 | Ex. |
| 8 | 1.5 | Hopeite $Zn_6Al_2(OH)_{16}CO_3 \cdot 4H_2O$ | 10 | 30 | $Ce(OH)_3$ $Ce(OH)_4$ | 0 | 5.5 | Ex. |
| 9 | 2.0 | Hopeite Phosphophyllite | 10 | 30 | $CeO_2$ $Ce(OH)_3$ $Ce(OH)_4$ | 0 | 3 | Ex. |
| 10 | 4.0 | Hopeite Phosphophyllite | 10 | 30 | $CeO_2$ $Ce(OH)_3$ $Ce(OH)_4$ | 1 | 5 | Ex. |
| 11 | 2.2 | Hopeite | 13 | 100 | $Ce(OH)_3$ $Ce(OH)_4$ | 0 | 4.5 | Ex. |
| 12 | 2.2 | Hopeite $Zn_6Al_2(OH)_{16}CO_3 \cdot 4H_2O$ | 20 | 200 | $CeO_2$ $Ce(OH)_3$ $Ce(OH)_4$ | 1 | 5 | Ex. |
| 13 | 2.1 | Hopeite | 25 | 250 | $Ce(OH)_3$ $Ce(OH)_4$ | 1 | 5.5 | Ex. |
| 14 | 2.2 | Hopeite $Zn_6Al_2(OH)_{16}CO_3 \cdot 4H_2O$ | 30 | 300 | $Ce(OH)_3$ $Ce(OH)_4$ | 2 | 7 | Comp. ex. |
| 15 | 4.5 | Hopeite | 13 | 100 | $Ce(OH)_3$ $Ce(OH)_4$ | 1 | 8 | Comp. ex. |

The bold underlines show outside the scope of the present invention.

Referring to Table 1, in Comparative Example 1 in which the chemical conversion coating does not contain Ce-based compounds, only naturally the effect of improvement of the corrosion resistance after coating due to the addition of Ce-based compounds was not obtained. As a result, the coating film blister width became 8 mm and a lower corrosion resistance after coating was exhibited compared with the 6 mm of a GA material. In Comparative Example 6, the amount of deposition of the zinc phosphate-based crystals was low, therefore the corrosion resistance after coating fell. The results of Comparative Example 6 were that the coating film adhesion was evaluated as being passing with a score of 1, but it is believed that this was due to the relatively low coating film adhesion exhibited in the range of the score of 1. In Comparative Example 14, the area ratio of the Ce compounds was high, therefore in the chemical conversion coating, the amount of deposition of the elutable Ce-based compounds became greater, the coating film adhesion fell, and in relation to this, the corrosion resistance after coating fell. In Comparative Example 15, the amount of deposition of the zinc phosphate-based crystals was large, therefore the corrosion resistance after coating fell. It is believed that as a result of the chemical conversion coating becoming thicker, the elution of Ce to the cathodic reaction region of the exposed part of the steel base material was inhibited.

In contrast to this, in the Al-plated hot stamped steel materials according to all of the other examples, by including the zinc phosphate-based crystals and Ce-based compounds in the chemical conversion coating and, furthermore, suitably controlling the amount of deposition of the zinc phosphate-based crystals and the area ratio of the Ce-based compounds, it was possible to keep the coating film blister width to 6 mm or less and achieve a corrosion resistance after coating improved compared with Comparative Example 1 not containing Ce-based compounds and, furthermore, equal to or better than a GA material. Further, while not shown in Table 1, in the Al-plated hot stamped steel materials of all of the examples, by observation by an SEM, the structure of the chemical conversion coating shown in FIG. 2A, i.e., a structure of zinc phosphate-based crystals on the surfaces of which Ce-based compounds are deposited, was confirmed.

REFERENCE SIGNS LIST 1. steel base material
2. Al-plating layer
3. chemical conversion coating
4. zinc phosphate-based crystals
5. Ce-based compounds
10. Al-plated hot stamped steel material

The invention claimed is:

1. An Al-plated hot stamped steel material comprising a steel base material,
an Al-plating layer formed on at least one surface of the steel base material, and
a chemical conversion coating formed on the Al-plating layer and containing zinc phosphate-based crystals and Ce-based compounds deposited on surfaces of the zinc phosphate-based crystals,
wherein an amount of deposition of the zinc phosphate-based crystals in the chemical conversion coating is 0.3 to 4.0 $g/m^2$ as determined by measuring an amount of deposition of metal Zn in the chemical conversion coating by fluorescent X-ray analysis based on JIS G 3314: 2011, and
an area ratio of the Ce-based compounds in the chemical conversion coating is 0.5 to 25%.

2. The Al-plated hot stamped steel material according to claim 1, wherein the zinc phosphate-based crystals contain at least one compound of hopeite and phosphophyllite.

3. The Al-plated hot stamped steel material according to claim 1, wherein the amount of deposition of the Ce-based compounds in the chemical conversion coating is 1.0 to 280 $mg/m^2$ as determined by measuring an amount of deposition of metal Ce in the chemical conversion coating by fluorescent X-ray analysis based on JIS G 3314: 2011.

4. The Al-plated hot stamped steel material according to claim 2, wherein the amount of deposition of the Ce-based compounds in the chemical conversion coating is 1.0 to 280 $mg/m^2$ as determined by measuring an amount of deposition of metal Ce in the chemical conversion coating by fluorescent X-ray analysis based on JIS G 3314: 2011.

5. The Al-plated hot stamped steel material according to claim 1, wherein the Ce-based compounds include at least one compound selected from $CeO_2$, $Ce(OH)_3$, and $Ce(OH)_4$.

6. The Al-plated hot stamped steel material according to claim 3, wherein the Ce-based compounds include at least one compound selected from $CeO_2$, $Ce(OH)_3$, and $Ce(OH)_4$.

7. The Al-plated hot stamped steel material according to claim 3, wherein the Ce-based compounds include at least one compound selected from $CeO_2$, $Ce(OH)_3$, and $Ce(OH)_4$.

8. The Al-plated hot stamped steel material according to claim 4, wherein the Ce-based compounds include at least one compound selected from $CeO_2$, $Ce(OH)_3$, and $Ce(OH)_4$.

9. The Al-plated hot stamped steel material according to claim 1, wherein the Al-plating layer includes an Al—Fe—Si alloy layer.

10. The Al-plated hot stamped steel material according to claim 2, wherein the Al-plating layer includes an Al—Fe—Si alloy layer.

11. The Al-plated hot stamped steel material according to claim 3, wherein the Al-plating layer includes an Al—Fe—Si alloy layer.

12. The Al-plated hot stamped steel material according to claim 4, wherein the Al-plating layer includes an Al—Fe—Si alloy layer.

13. The Al-plated hot stamped steel material according to claim 5, wherein the Al-plating layer includes an Al—Fe—Si alloy layer.

14. The Al-plated hot stamped steel material according to claim 6, wherein the Al-plating layer includes an Al—Fe—Si alloy layer.

15. The Al-plated hot stamped steel material according to claim 7, wherein the Al-plating layer includes an Al—Fe—Si alloy layer.

16. The Al-plated hot stamped steel material according to claim 8, wherein the Al-plating layer includes an Al—Fe—Si alloy layer.

* * * * *